July 21, 1942.   E. F. WAIT ET AL   2,290,624
METHOD OF MAKING TIRES
Original Filed Dec. 17, 1936   6 Sheets-Sheet 1

INVENTOR
Edgar F. Wait
AND
James E. Hale
BY
Ely & Frye
ATTORNEYS

July 21, 1942.  E. F. WAIT ET AL  2,290,624
METHOD OF MAKING TIRES
Original Filed Dec. 17, 1936   6 Sheets-Sheet 6

INVENTOR
Edgar F. Wait
AND
BY James E. Hale
ATTORNEYS

Patented July 21, 1942

2,290,624

UNITED STATES PATENT OFFICE 2,290,624

METHOD OF MAKING TIRES

Edgar F. Wait, Detroit, Mich., and James E. Hale, Akron, Ohio, assignors to The Firestone Tire & Rubber Company, Akron, Ohio, a corporation of Ohio Original application December 17, 1936, Serial No. 116,312, now Patent No. 2,241,227, dated May 6, 1941. Divided and this application May 25, 1940, Serial No. 337,248

3 Claims. (Cl. 154—14)

This invention relates to pneumatic tires and to methods of making the same, and more especially it relates to the structure of pneumatic tires having extremely high traction elements, such as are used, for example, on tractors in cane fields and rice fields, and to improved procedure for manufacturing the same, the present application being a division of application #116,312, filed December 17, 1936, which resulted in Patent #2,241,227, issued May 6, 1941.

In tires of the character mentioned, the height of the traction elements may be as much as 20% of the total radial height of a section of the tire. If these tires are manufactured in the usual, well known manner, there is considerable separation of the tread slab from the fabric carcass of the tire due to the unusually large flow of rubber in said tread during the molding of the tire. Another objection to the foregoing method is that the large flow of tread rubber required in the formation of the traction elements frequently results in the formation of undesired concavities in the fabric carcass of the tire. One way of overcoming this difficulty is to build up the unvulcanized tire by adding traction elements to the tread thereof, which elements almost exactly fit the grooves in the mold in which the tire subsequently is vulcanized. Although this method produces tires of satisfactory quality, the cost of the tires is so great as to be prohibitive.

The chief objects of this invention are to provide improved procedure for the manufacture of tires having extremely high traction elements; to bring the cost of manufacturing such tires within a competitive range; and to provide improved construction in tires of the character mentioned. More specifically the invention aims to obviate separation of the tread from the underlying fabric plies during the molding and vulcanizing of tires formed with extremely high traction elements. Other objects will be manifest.

Briefly stated, the invention consists essentially in the interposition of a relatively soft, easily flowable layer of rubber of substantial thickness between the fabric carcass of the tire and the relatively stiff, tough tread slab thereon, during the fabrication of the tire, to the end that extreme deformation of the tread slab, during molding, does not result in the separation of the rubber from the fabric carcass.

Figure 3:
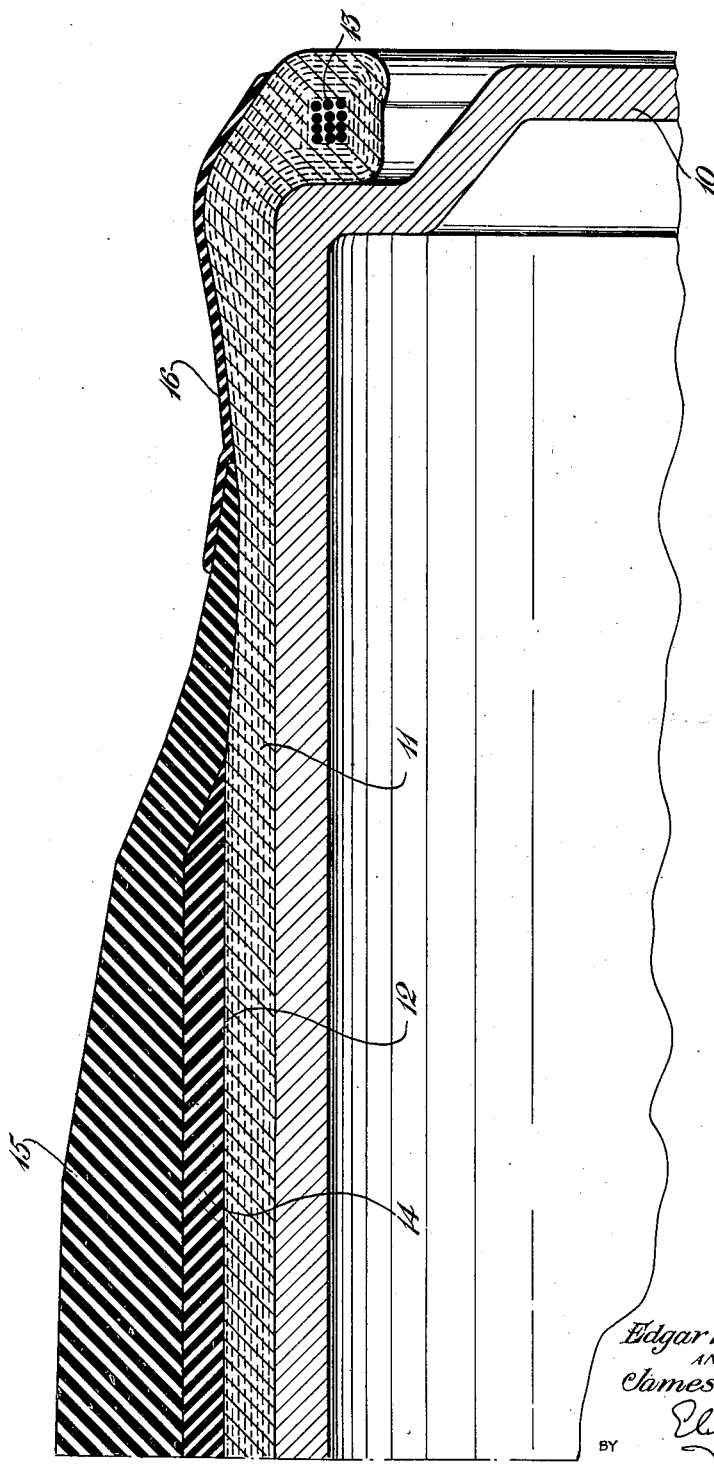
Figure 3 is a full size fragmentary section through a tire embodying the invention, as it appears before vulcanization.

The tire, as it initially is fabricated, is best shown in Figure 3 wherein 10 is the usual annular, sectional, rotatable tire-building form or drum upon which the tire is built. The tire on said drum comprises the usual carcass plies of rubberized fabric 11, including breaker strips 12, and inextensible beads, such as the bead 13, at the opposite lateral margins thereof. Positioned over the breaker strips 12, and slightly narrower than the latter, is a heavy, circumferential layer of relatively soft, readily flowable rubber composition 14. The tire includes a tread slab 15 of relatively stiff, tough, abrasion-resisting rubber composition such as includes carbon black pigment, and respective side-wall strips, such as the strip 16, overlap the respective lateral margins of said tread slab and extend therefrom to the beads of the tire. It will be seen that the tread slab extends well beyond the lateral margins of the soft rubber layer 14, and its mass is diminished by an amount equal to the mass of the soft layer 14. The completely fabricated tire band is removed from the form 10 by collapsing the latter in the usual manner, after which the tire band is shaped to tire form, and an expansible core 17 mounted therein.

Figure 4:
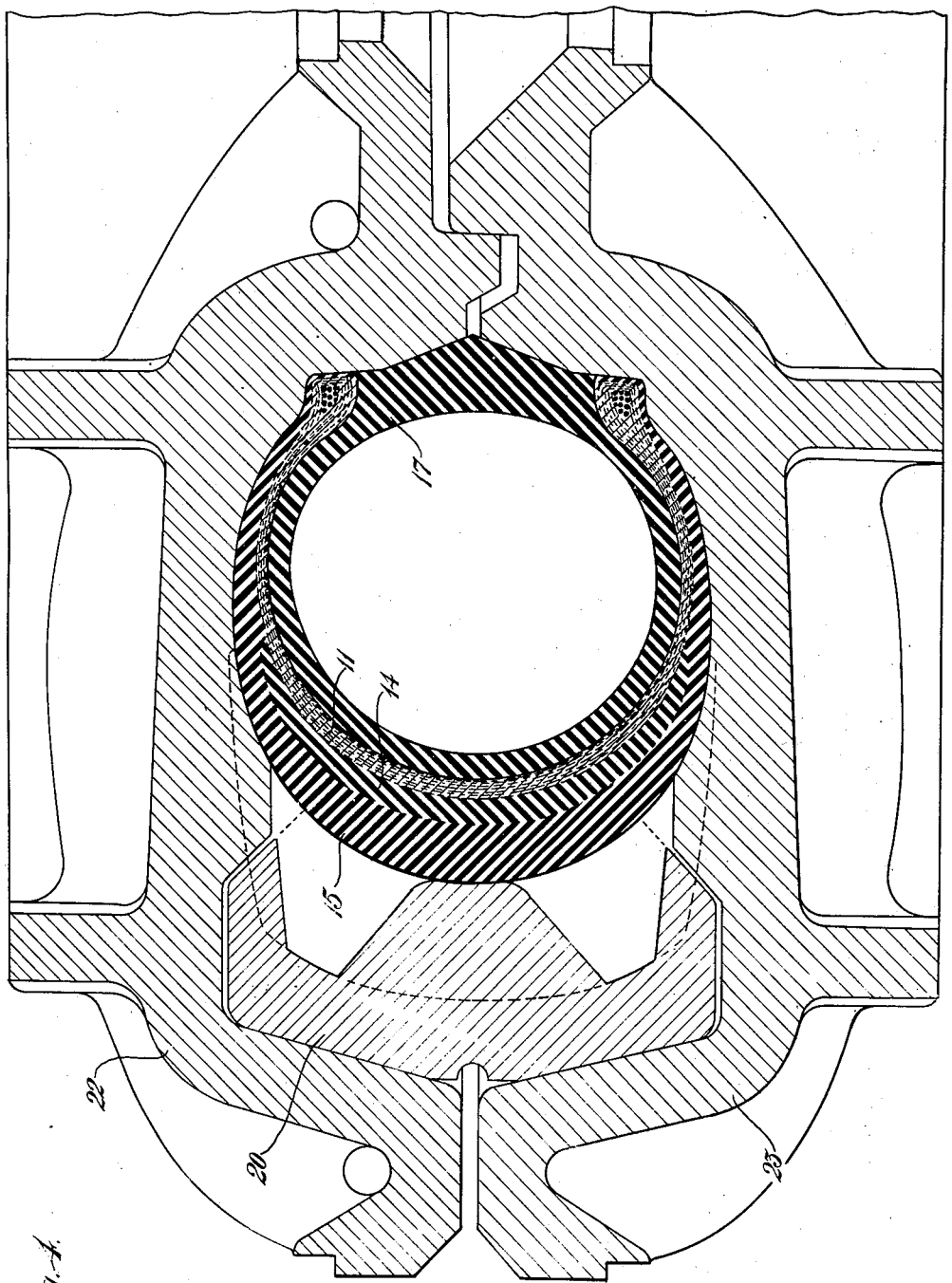
Figure 4 is a transverse section through the improved tire, in unvulcanized condition, and a mold within which the tire is mounted, before the latter is fully closed upon the tire.
Figure 7:
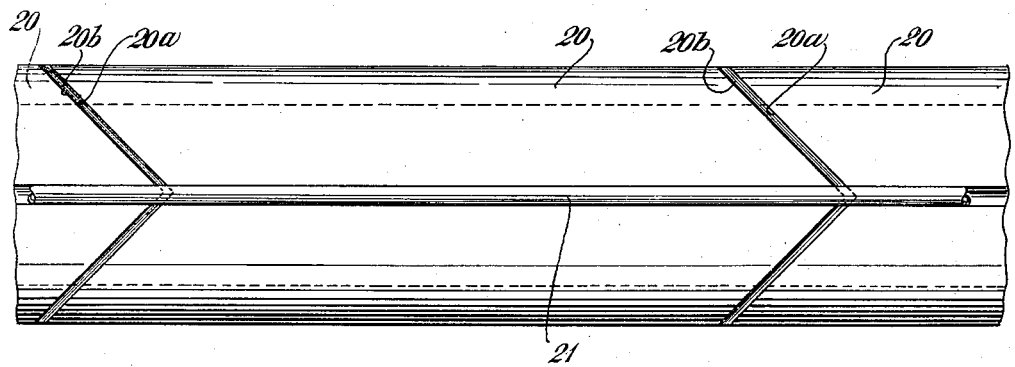
Figure 7 is a fragmentary edge elevation of a plurality of removable tread-molding sections assembled upon an unvulcanized tire.

The tire is then prepared for molding by mounting upon the outer periphery thereof a circumferential series of tread-molding members 20, 20 the same being temporarily retained in place on the tire by means of a removable clamping ring 21, Figure 7. As shown in the latter figure, the tread molding members 20 are formed at opposite ends with angular configurations 20a and 20b complementary to, and in circumferentially overlapping relationship with, adjacent tread molding members, with the result that the tread molding members are maintained in more positive alignment and registry with the adjacent tread members. This configuration also avoids the tendency of the tread molding members to pinch the surface of the tread rubber and prevents the formation of a thick fin or rand. The tire, with tread molding members 20 thereon, is then mounted as a unit in a cavity mold comprising upper section 22 and lower section 23, the ring 21 being removed after the assembly is in mold section 23, before upper mold section 22 is mounted thereon. This condition of the mold and tire is shown in Figure 4, wherein it will be seen that tire and the tread molding members 20 are such as to hold the mold in slightly open position for the reason that the members 20 are not yet moved to ultimate molding position.

Figure 5:
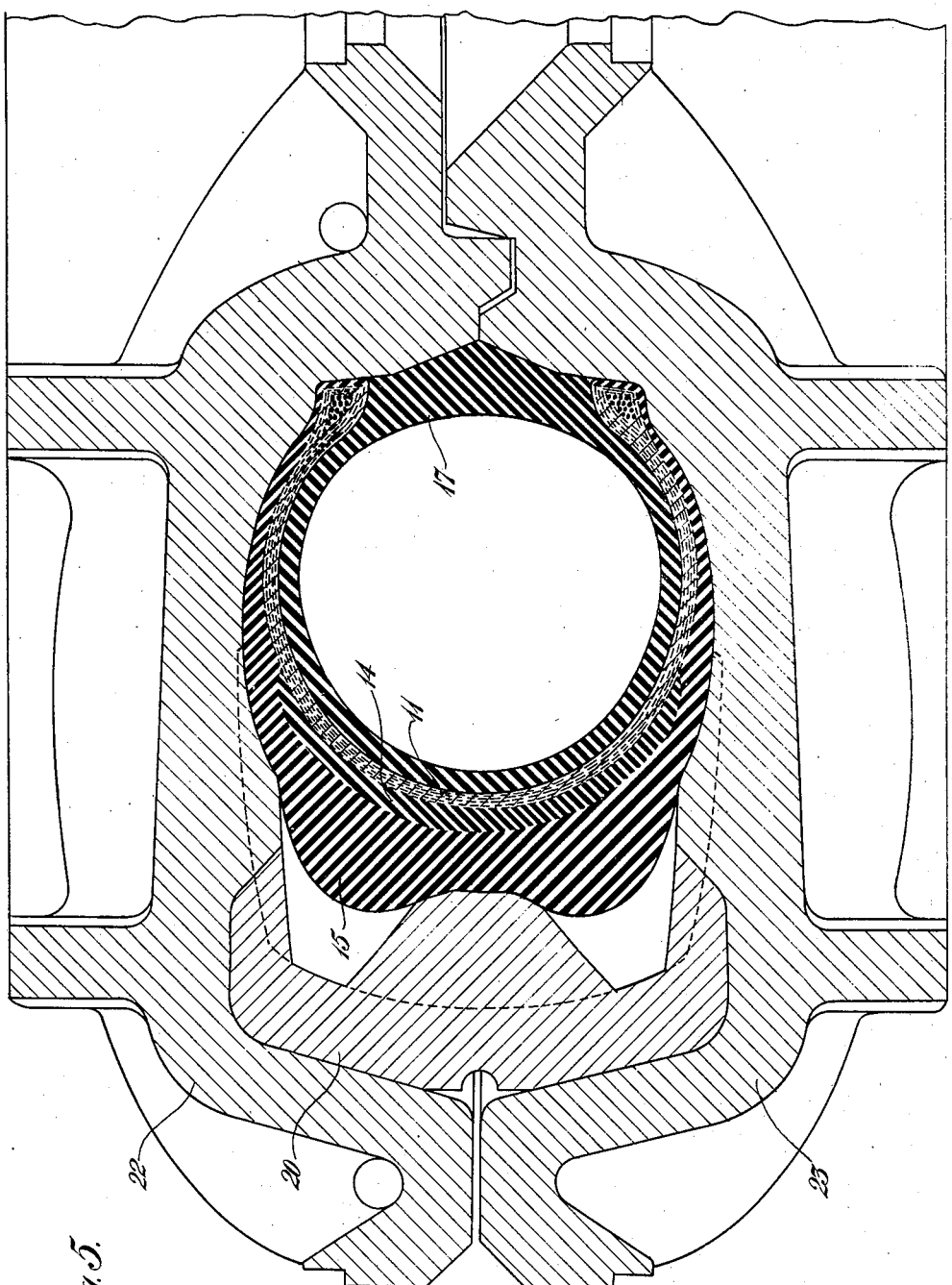
Figure 5 is a view of the structures shown in Figure 4, with the mold in completely closed condition, but before expansion of the expansible core within the tire.

The succeeding step in the molding of the tire is shown in Figure 5. Pressure has been applied to the mold sections 22, 23 completely to close the same, the tread molding members 20 have been forced somewhat radially inwardly by reason of the tapered inter-engaging surfaces of the treadmolding members and the mold sections, and the tire structure has been somewhat flattened and forced radially outwardly by the confining pressure of the mold sections, with the result that some deformation of the tread portion 15 of the tire is apparent.

Figure 6:
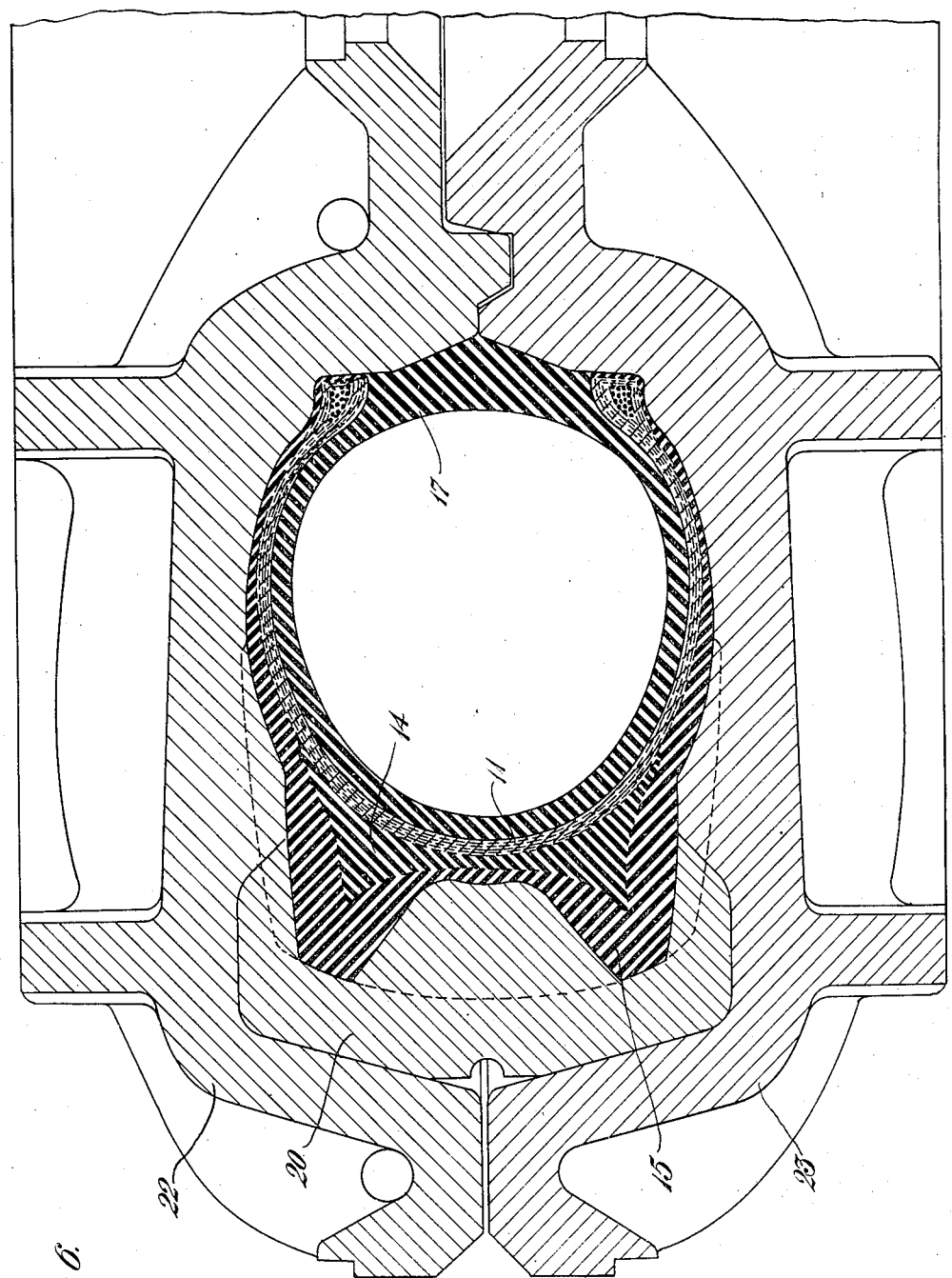
Figure 6 is a view similar to Figure 5 showing the expansible core in expanded condition.
Figure 8:
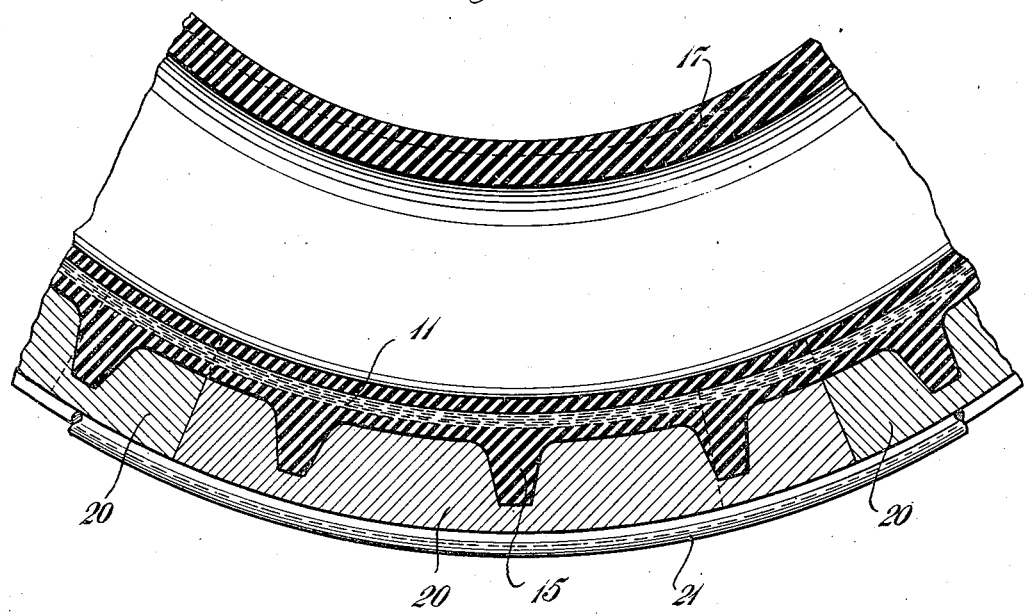
Figure 8 is a fragmentary section of a vulcanized tire and tread-molding sections associated therewith, said section being taken in the central plane of the assembly.

The tire is then vulcanized in the usual manner, the mold sections 22, 23 being subjected to vulcanizing heat and the expansible core 17 being distended to a determinate degree by the admission of pressure fluid at vulcanizing temperature to the interior thereof. The unvulcanized rubber of the tire softens in the presence of heat, and the pressure of the expansible core forces the rubber of the tread slab 15 into the deep cavities of the tread molding members 20, as shown in Figures 6 and 8. Because the rubber composition 14 is relatively soft as compared to the composition of the tread slab 15, the latter is enabled more readily to assume the extreme deformation required, the soft composition 14 being deformed to a somewhat lesser extent than the tread slab 15, but conforming generally to the contour of the traction elements, and at all times maintaining the bond between the tire carcass and the composition 15 whereby separation is avoided.

Figure 1:
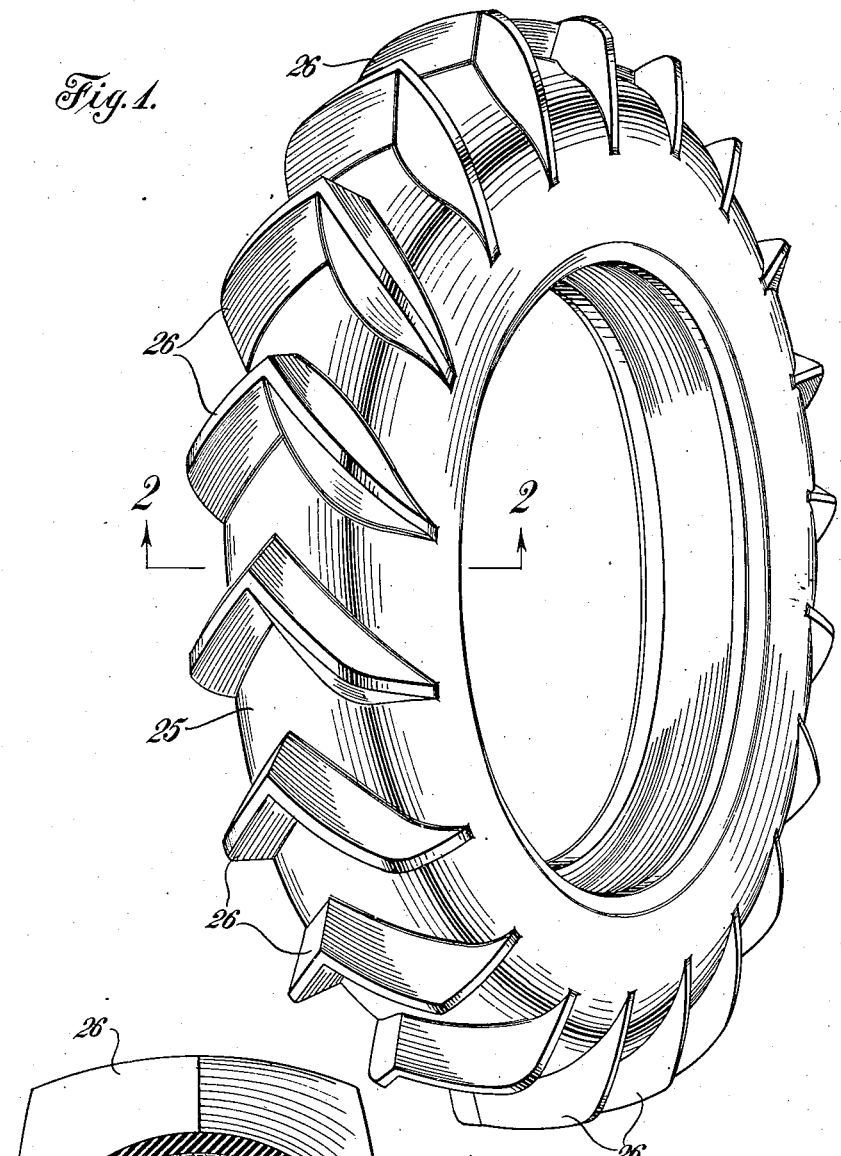
Figure 1 is a perspective view of a pneumatic tire embodying the invention and made according to the improved method thereof.
Figure 2:
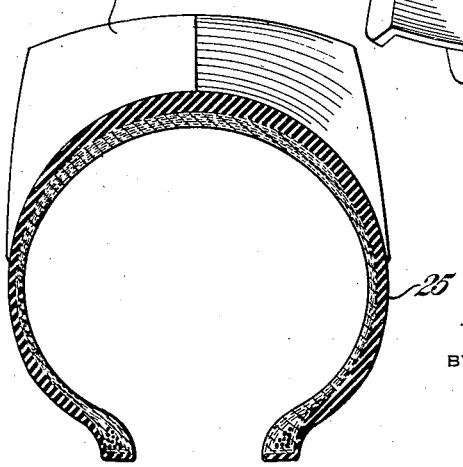
Figure 2 is a section, on a larger scale, on the line 2—2 of Figure 1 showing the relative sectional height of the tire and the traction elements.

A finished tire produced by the herein described method is shown in Figure 1 wherein the tire generally is designated 25, and 26, 26 are the traction elements thereof. As shown, the height of the elements 26 is substantially 20% of the total height of the radial section of the tire. Obviously the elements 26 may be of different shape than shown.

By the use of the layer of soft, readily flowable rubber composition under the tread slab, the molding of tires having relatively tall traction elements has been simplified, the interior of the tire casing is uniformly smooth and free from recesses or concavities under the tread, and the manufacture of the tires made commercially practicable. Furthermore, the rubber composition 14 retains its relatively soft character even after vulcanization, with the result that torsional strains on the elements 26, incidental to use, are distributed over a larger area of the carcass of the tire, and said elements have a measure of resiliency that permits such relative movement between adjacent elements, during use, as materially to contribute to the automatic ejection of mud and soil from between the elements.

Modification may be resorted to without departing from the spirit of the invention or the scope of the appended claims, which are not limited wholly to the specific construction shown, or exact procedure described.

What is claimed is:

1. A method of making a tire of the type wherein spaced traction elements project outwardly a substantial distance from a relatively smooth crown and sidewall portion, said method comprising assembling a tire carcass, applying a layer of uncured soft rubber to the crown area of said carcass, applying a layer of relatively tough uncured rubber to said layer of soft rubber, disposing said carcass and applied rubber layers within a mold provided with element-forming pockets, and applying pressure to force portions of said assembled layers into the mold pockets, the soft rubber being disposed centrally of the pockets, and applying heat to effect vulcanization therebetween and between the carcass and layers, said soft rubber providing an expansible core during heat application whereby to maintain uniformity of pressure between the carcass and the tread layer during vulcanization.

2. A method of making a tire consisting of forming a green tire by applying a layer of soft readily flowable rubber composition to a preformed carcass, applying a second layer of rubber composition to the soft layer, said second layer being of relatively tough tread-forming composition, disposing the green tire thus formed within a mold having deep traction element-forming pockets, applying heat and pressure to the green tire whereby to force the tire toward the mold to cause said outer layer of tread material to flow into the traction element pockets, said soft composition simultaneously flowing outward from the carcass to form soft cores under the traction elements.

3. Those steps in the making of a tire consisting of applying a layer of soft uncured readily flowable rubber composition to a tire carcass, applying a second layer of rubber composition to said first layer, the second layer of said composition containing a reenforcing agent, disposing the carcass and applied layers in a mold having circumferential pocket portions forming tall tread elements, applying pressure internally of the carcass to force the applied layers into the pockets and into engagement with the mold walls, whereby portions of the soft layer are forced into the center of the pockets to be enclosed by the outer layer portions therein, and applying heat to vulcanize the carcass and mold shaped layers into a completed tire.

EDGAR F. WAIT.
JAMES E. HALE.